United States Patent Office 2,787,554
Patented Apr. 2, 1957

2,787,554

OPTICAL GLASS

Paul F. De Paolis, Rochester, N. Y., assignor to Eastman Kodak Company, Rochester, N. Y., a corporation of New Jersey No Drawing. Application November 24, 1954,
Serial No. 471,105

1 Claim. (Cl. 106—47)

This invention relates to optical glass and specifically to an improvement of the optical glass described in U. S. 2,206,081, Eberlin, granted July 2, 1940.

The object of the present invention is to provide a glass of greater stability, greater ease of working, for example greater ease of polishing when used in the making of optical elements and greater resistance to staining, weathering, etc., and particularly greater resistance to devitrification during manufacture of the glass itself.

In addition to all of these important advantages, a glass according to the present invention actually pushes back the frontiers of the refraction-dispersion chart even further than any previous glass. This trend was started by Dr. George W. Morey as described in his Reissue Patent 21,175. It was possible, following the teachings of Morey and Eberlin to obtain a higher dispersion index for any given refractive index or alternatively to obtain a higher refractive index for any given dispersion index than was possible prior to the discoveries of Morey and Eberlin. The present invention actually goes even further than either Morey or Eberlin in obtaining a still higher refractive index for a given dispersion index or a still higher dispersion index for a given refractive index.

The actual gain in either dispersive index or refractive index over the teachings of Eberlin is small, but the important fact is that the optical advantage of the Eberlin glass do not have to be sacrificed but are actually improved at the same time as the improvement in chemical and physical properties of the glass is obtained. It is well known that the addition of stabilizing materials to high index glasses tends to reduce either the refractive index or dispersion index. The present invention goes contrary to that trend and accomplishes simultaneously improvement in both the physical and optical properties.

Still another object and perhaps one of the more unique features of the present invention is that it provides a glass of such fine workability that it can be made in very thick slabs up to two inches or more, which is beyond the possibilities of prior glasses in this high index range.

According to the present invention the glass is made from a batch containing in addition to the oxides of lanthanum, tantalum, thorium and boron, oxides of barium and tungsten, all within specified ranges of percentages in order to give the desirable properties outlined above. In a preferred form of the invention the oxides of barium and tungsten are introduced at least partly as barium tungstate. This has a real advantage in practice over the use of tungstic oxide since the latter chemical is difficult to produce free from iron because of the nature of the chemical processes used for purifying tungstic oxide whereas the process for making barium tungstate is much more favorable to the elimination of iron. Also barium tungstate is less likely to settle out during melting than is the heavier tungstic oxide. The boron may be added to the batch in the form of boric acid, but in any case may be considered as $B_2O_3$. That is, only the $B_2O_3$ content of the boric acid is considered in computing the percentages in the batch.

The new frontier established by the present invention is a line on the refraction-dispersion chart running between $N_D=1.89$, $V=41$ and $N_D=1.82$, $V=45$. The specific Example B given below has $N_D=1.8434$ and the Abbe value V equal to 43.2. Increasing the thorium slightly and decreasing the lanthanum slightly lowers the $N_D$ and raises the V value but still holds the glass on or beyond this new frontier.

According to the invention the glass batch from which the glass is made contains oxides in the following percentages by weight:

| | Percent by weight |
|---|---|
| Lanthanum oxide | 25 to 35 |
| Tantalum oxide | 15 to 25 |
| Thorium oxide | 20 to 30 |
| Boron oxide | 15 to 25 |
| Barium oxide | 2 to 10 |
| Tungsten oxide | 0.5 to 5 |

Working with glasses of these high indices often presents special complications in the form of devitrification in which the crystalline compounds are such that they cannot be remelted at the same temperature. The present invention avoids these difficulties and preferred embodiments thereof consist of glasses made from batches according to the following formula given as percentages by weight:

| | A, percent | B, percent |
|---|---|---|
| Lanthanum oxide | 28 | 28.2 |
| Tantalum oxide | 20 | 20.1 |
| Barium tungstate | 2 | 2.1 |
| Barium oxide | 3 | 3.2 |
| Thorium oxide | 25.5 | 25.5 |
| Boric oxide | 21.5 | 20.9 |

In the above formulas the barium tungstate may be considered as approximately 60% tungstic oxide and 40% barium oxide. Thus the percentage of oxide of tungsten in the batch is about 1.2% well within the preferred range of 0.5 to 5 mentioned above. The thorium oxide may be increased to 30% with a corresponding decrease in the lanthanum or tantalum or the thorium content may be dropped to 20% with a corresponding increase in the amounts of the other two materials. The presence and particular percentages of the barium and tungsten are the factors which provide the novel advantages of the present invention and the introduction of these materials is sometimes accompanied by a slight increase in the boron content so that the percentages of lanthanum, tantalum and thorium oxides are all reduced in proportion to the amounts of barium and tungsten oxides added. Percentages of barium oxide up to 10% or tungsten oxide up to 5% (along with about 25% boron oxide) as thus associated with amounts of lanthanum, tantalum and thorium oxides down around 25, 15 and 20% respectively.

I claim:

A glass resulting from fusion of a glass batch consisting essentially of the following percentages by weight:

| | Percent |
|---|---|
| Lanthanum oxide | 28 |
| Tantalum oxide | 20 |
| Barium tungstate | 2 |
| Barium oxide | 3 |
| Thorium oxide | 25.5 |
| Boric oxide | 21.5 |

References Cited in the file of this patent

UNITED STATES PATENTS 2,434,149     De Paolis ------------ Jan. 6, 1948